US008620917B2

(12) United States Patent
Georgescu et al.

(10) Patent No.: US 8,620,917 B2
(45) Date of Patent: Dec. 31, 2013

(54) SYMANTIC FRAMEWORK FOR DYNAMICALLY CREATING A PROGRAM GUIDE

(75) Inventors: Sorin Marian Georgescu, Mount Royal (CA); Edoardo Gavita, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/335,463

(22) Filed: Dec. 22, 2011

(65) Prior Publication Data

US 2013/0166561 A1 Jun. 27, 2013

(51) Int. Cl.
*G06F 17/30* (2006.01)

(52) U.S. Cl.
CPC ............... *G06F 17/30746* (2013.01)
USPC ........... 707/737; 707/708; 707/741; 707/748; 707/752; 707/802

(58) Field of Classification Search
CPC ................................................ G06F 17/30746
USPC ......... 707/737, 602, 705, 708, 739, 752, 780, 707/790, 802, 811, 741, 748
See application file for complete search history.

(56) References Cited

U.S. PATENT DOCUMENTS

| 5,973,683 | A | 10/1999 | Cragun et al. | |
|---|---|---|---|---|
| 7,634,471 | B2* | 12/2009 | Chen et al. | 707/999.003 |
| 7,720,849 | B2* | 5/2010 | Asano | 707/739 |
| 7,873,798 | B2* | 1/2011 | Miyazaki et al. | 711/154 |
| 7,987,182 | B2* | 7/2011 | Slothouber et al. | 707/722 |
| 8,200,597 | B2* | 6/2012 | Wang et al. | 706/45 |
| 8,359,322 | B2* | 1/2013 | Yamamoto et al. | 707/758 |
| 2010/0235351 | A1 | 9/2010 | Iwasa et al. | |
| 2011/0022587 | A1 | 1/2011 | Aravamudan et al. | |
| 2011/0258188 | A1* | 10/2011 | AbdAlmageed et al. | 707/736 |
| 2012/0046936 | A1* | 2/2012 | Kandekar et al. | 704/9 |

OTHER PUBLICATIONS

Netflix Prize, from Internet http://en.wikipedia.org/wiki/Netflix_Prize, downloaded on Aug. 20, 2012; 6 pages.
Apple Genius Playlists, from www.maclife.com/article/news/genius_makes_smart_playlists_even_smarter, downloaded on Aug. 20, 2012; 5 pages.

* cited by examiner

*Primary Examiner* — Dangelino Gortayo
(74) *Attorney, Agent, or Firm* — Ericsson Canada Inc.; Dilip C. Andrade

(57) ABSTRACT

An application server includes a Semantic Analysis Core Service (SACS) function that communicates with a Semantic Analysis Client (SAC) in a Set Top Box (STB). The SACS groups programs available for rendering to a subscriber into program clusters. The SACS generates the program clusters based on a determined semantic similarity between the programs, and on parameters that indicate a subscriber's preference for certain program content. The program that are semantically similar to existing clusters within a predetermined viewing window are provided to the STB and output to the subscriber on a display as a program preference list or channel line-up. The STB also monitors the subscriber's interaction with the programs and calculates a preference score for each program indicating the subscriber's continuing, or waning, interest in a given program. The preference score is used to update the score of the program cluster to which the program belongs.

29 Claims, 8 Drawing Sheets

SYMANTIC FRAMEWORK FOR DYNAMICALLY CREATING A PROGRAM GUIDE

FIELD OF THE INVENTION

The present invention relates to Internet Protocol Television (IPTV) based systems that classify video programs based on the semantic similarity of their content.

BACKGROUND

Hybrid Set Top Boxes (STBs) have started recently to penetrate the television (TV) market. As is well-known in the art, hybrid STBs allow the aggregation of traditional TV broadcasts with video that is delivered by both managed (e.g., cable, satellite, xDSL) and unmanaged (e.g., the Internet) networks. To accomplish this, hybrid STBs are designed to provide access to multiple access network types.

Hybrid STBs have allowed subscribers to create new consumer-focused TV experiences; however, they also create problems. Particularly, hybrid STBs and the networks to which they connect have allowed providers to significantly increase the number of channels in the channel lineup. Although such an increase in the choice of programs is beneficial, the sheer volume of content often overwhelms the subscribers. Therefore, subscribers generally rely on some well-known methods to manage the amount of content.

In a first method, subscribers typically employ a channel position programming function, in which the content providers assign certain channels and content to specific, sequential channel groupings. With this method, subscribers can skip over large portions of a channel lineup so that they can quickly and easily view only the content they consider interesting. However, because the channel groupings do not change often, this type of ordering technique is not entirely beneficial. For example, because subscribers are able skip over large portions of a channel lineup, they could miss a chance to view a program that they may find interesting. Additionally, content providers can potentially lose revenue opportunities from targeted advertisements on channels that the subscriber skips over. Further, although the channel lineup is mostly static, it will change from time-to-time. When it does change, subscribers must learn the new channel groupings, which can be time-consuming and, at times, frustrating.

Another method of organizing and managing the overwhelming content is by using the search function associated with an Electronic Program Guide (EPG). With these search functions, a subscriber can input the name or genre of a program, for example, to determine when content related to that input will be available for viewing. However, searching through the EPG is not very efficient. Such searches are typically keyword-based, which means that programs can only be located in an EPG if a description of the content includes the keywords entered by the subscriber. Thus, an EPG search function is useful, but only if the subscriber already knows the title (or a part of the title) of the program, or some other specific information about the program. It is not very useful where a channel lineup changes dynamically, or where the search is based on a subscriber's preferences in terms of type of content.

One way to search through a large number of channels based on content is by performing a semantic search. Semantic searching is an area of research currently being promoted due to the interest in the Semantic Web or Web 3.0. As known in the art, the Semantic Web is an effort to convert the unstructured documents that currently form the web (e.g., web pages) into a web of related data based on one or more related concepts between documents.

Methods and functions facilitating a semantic search generally calculate the similarity between objects by focusing on the relationships that exist between artifacts (i.e., concepts, words, phrases, signs, and/or symbols) in the information and data associated with the objects. Although there are a variety of techniques available for computing the semantic similarity of two objects, most semantic functions typically rely on one or more knowledge sources to provide evidence of the similarity of the artifacts.

For example, semantics may be automatically inferred from information distribution of terms in a given corpus (i.e., a body of words or sentences, assumed to be representative of, and used for, lexical, grammatical, or other linguistic analysis) without requiring input from a subscriber. Additionally or alternatively, the semantics may be based on an ontology (i.e., a formal description or specification of the concepts and relationships that can exist between two or more objects). In some cases, semantic functions may combine the knowledge provided by an ontology with the information content (i.e., a measure of the amount of information provided by a given term from its computed probability of appearance in a corpus) of the concepts that are being compared.

Semantics may also be inferred from a semantic graph. With semantic graphs, the nodes of the graph may represent concepts, while the links between nodes indicate the "semantic interrelations" that exist between the nodes. In these cases, semantics may not rely on a corpus related to any particular domain.

Although useful, each of these traditional channel handling methods can be problematic. For example, the channel position programming and EPG search methodologies, as stated above, are not well-suited to the dynamic nature of the content delivered to the subscriber when multiple information feeds are available. Subscribers will often skip over one or more subsets of channels to find one particularly desired program, and generally do not receive recommendations for specific content. Consider, for example, a search for a movie based on rating, which may be graphically illustrated using one or more stars. Particularly, the attribute(s) that are searched on (i.e., the stars) provide semantic information indicating whether a critic that reviewed the movie liked the movie. Star rate searches can be used for some content, such as movies, but can not be used for all types of content (e.g., news or music programs). Therefore, the information available in the EPG may be insufficient for performing at least some searches.

Semantic searches and semantic clustering on the other hand, offer much more flexibility. With semantic clustering, content that is semantically similar is grouped or clustered into one or more corresponding groups. However, known methods that are used to calculate the semantic similarities between two natural language objects have multiple drawbacks that make such methods unsuitable to an application that supports a dynamic channel lineup.

For example, unsupervised semantic clustering requires the definition of a classification measure that directly influences the size of the semantic cluster. Usually, a clustering algorithm controls which programs get added to the semantic cluster; however, the algorithm generally cannot be adapted to consider the personal preferences of a subscriber because the clustering algorithm does not employ feedback information provided by the subscriber. Further, semantic classification usually occurs before the subscriber has a chance to provide input.

Ontology-based clustering requires the existence of a TV content ontology. Besides the fact that such ontology is not generally available, not every TV program can be defined in the terms of an ontology in real time (e.g. news programs). Such information may include, but is not limited to, subscriber-provided feedback regarding a program and/or a channel that is being watched by the subscriber.

Finally, semantic graphs can be easily generated from EPG data. However, like unsupervised semantic clustering, there is generally no way to capture the personal preferences of the subscriber since the graph is generated by analyzing the semantic interrelations between the elements of the input natural language within a predetermined EPG description.

SUMMARY

The present invention provides a system and method for semantically classifying video programs that are available for rendering to a subscriber within a predetermined time window, and then using that classification to assign the programs to an appropriate one of a cluster of programs having similar content.

In one embodiment, an application server clusters semantically similar programs (i.e., programs having similar content) into an appropriate program cluster. Particularly, the application server extracts terms from a description associated with a program that match attributes defined in a content ontology. The application server may also process the extracted terms, and/or the description, based on the content ontology to obtain one or more synonymous terms that match the attributes in the content ontology. Based on the extracted terms, and on the synonymous terms, if any, the application server compiles a set of semantic features associated with the program.

Each program cluster comprises a plurality of programs having semantically similar content. Accordingly, for each of the plurality of program clusters, the method calculates a semantic similarity value representing the semantic similarity between the set of semantic features associated with the program and a semantic feature set of the program cluster. The method then selects the highest semantic similarity value resulting from a comparison of the program with all the program clusters. Provided the highest semantic similarity value equals or exceed exceeds a predetermined threshold, the method will add the program to the associated cluster. If no semantic cluster exists, or the calculated semantic similarity value is below the threshold (i.e., the program is not sufficiently semantically similar enough to the programs in any existing program clusters), the method creates a new semantic cluster. The newly created program cluster could include the most relevant semantic features extracted from the program description with respect to the content ontology. However, the number of semantically relevant features included in the cluster may be limited by a predetermined threshold.

Calculating the semantic similarity value may be accomplished in any manner known in the art. However, in one embodiment, the application server calculates a ratio of a semantic weight of common semantic features to a sum of a semantic weight of the common semantic features and a measure of the semantic weight of dissimilar semantic features. To prevent the ratio from producing an unbounded value, the application server may multiply the ratio by an exponential term that limits growth of a program cluster.

In another embodiment, the present invention provides a method of ordering programs offered to a subscriber that is based, in part, on subscriber feedback. In this embodiment, a Set Top Box (STB) retrieves a plurality of subscriber-specific preference scores associated with each of one or more program clusters. The STB orders the constituent programs in the program clusters that are available within a predefined viewing window based on the preference scores, and then outputs the ordered list of programs to the subscriber based on the ordering. Thereafter, the STB detects and quantifies subscriber feedback with respect to a selected program, and uses that feedback to dynamically update subscriber-specific preference score of the semantic cluster associated with the program. Such updates may be triggered by the occurrence of a predetermined event, such as when a program currently being watched by the subscriber ends, or when the subscriber changes the channel.

Of course, those skilled in the art will appreciate that the present invention is not limited to the above contexts or examples, and will recognize additional features and advantages upon reading the following detailed description and upon viewing the accompanying drawings

DETAILED DESCRIPTION

The present invention provides a system and method for semantically classifying video programs that are available for rendering to a subscriber within a predetermined time window, and using that classification to assign the programs to an appropriate cluster of programs having similar content. More particularly, the present invention compiles a set of semantic features for a program by semantically processing content-related artifacts (e.g., words, terms, symbols, signs, and phrases) contained in the descriptions of the programs. Then, a "semantic similarity value" is calculated based on the semantic feature set associated with the program and a respective semantic feature set of each of a plurality of program clusters, and is a measure of how semantically similar the given program is to the programs contained in each respective program cluster. The highest semantic similarity value indicates which of the program clusters is most semantically related to the program. Provided the value equals or exceeds a predetermined threshold, the program is added to that cluster.

A subscriber is then provided with a channel lineup that includes the semantically clustered programs. Whatever programs are currently "on," or about to be "on" within a predetermined time window, may be displayed. While a given program is being rendered, a software client module in a Set-Top-Box (STB) retrieves information that indicates the subscriber's interest in programs having similar content from a network server. The STB also monitors the subscriber's environment to determine the level of interest of the subscriber in the given program. Based on the monitoring, the STB, or other network entity, calculates a preference score for the program that indicates the likelihood that the user would be interested in similar content. The preference score is then used to rank or order the semantic cluster of programs in terms of subscriber interest. This allows the subscriber to access the most preferred programs that are available, or soon will be available, quickly and easily.

Figure 1:
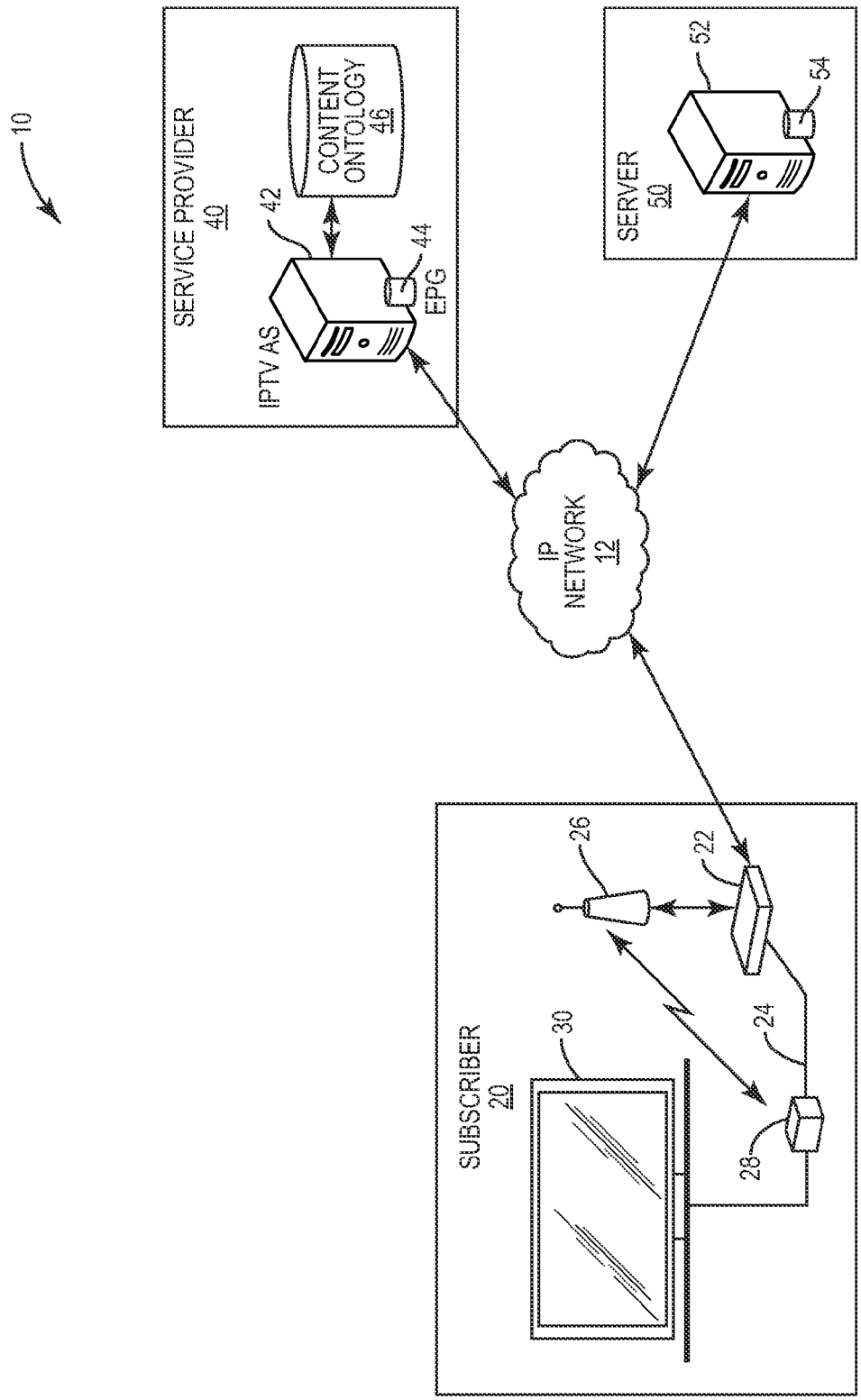
FIG. 1 is a block diagram illustrating a system suitable for use in one embodiment of the present invention.

Turning to the drawings, FIG. 1 depicts the architecture of an overall network 10 used for IPTV multimedia content distribution according to embodiments of the present invention. The overall network 10 includes a core IPTV network 12, which may for example comprise a telecommunications services or cable operator network connected to a home network 20, a service provider network 40, and one or more other data sources 50 having information and data accessible to the service provider network 40.

The home network 20 includes a home or residential gateway 22, which may be connected via a wired connection 24, or via a wireless access point (WAP) 26, to one or more Set Top Boxes (STB) 28. Each STB 28 is further associated with and connected to a rendering unit 30, such as a television screen. As used herein, a rendering unit 30 is understood to include an associated STB 28 or other networking or control hardware as required for functionality within the IPTV system 10.

The wired connection 24 may comprise, for example, an Ethernet network, while the wireless access point (WAP) 26 may comprise an access point operating according to any wireless standard known in the art. In one embodiment, however, the wireless access point (WAP) 26 communicates information and data wirelessly with the STB 28 in accordance with the standards referred to as IEEE 802.11x or "Wi-Fi."

In general, neither an Ethernet network nor a Wi-Fi network are optimized for the distribution of multimedia content to a rendering unit 30 in home network 20. Although wireless access points such as wireless access point (WAP) 26 are optimized for data transmission, they usually do not provide the Quality of Service (QoS) required by IPTV applications. In contrast, wired networks, such as Ethernet networks, are able achieve the requisite bandwidth and QoS requirements; however, few homes are wired with the cable to each room in which a rendering unit 30 may be deployed. Further, retrofitting a house with Ethernet cable is troublesome, expensive, and often unsightly. Networking technologies that take advantage of existing home wiring (such as power lines, telephone line, coaxial cables, and the like) offer a potential solution for the home network 20 portion of an IPTV system 10. For example, in 2008, ITU-T adopted Recommendation G.hn (also known as G.9960), which is a home networking standard that specifies common PHY/MAC layers that can operate over any home wiring.

Those of ordinary skill in the art will readily appreciate that FIG. 1 depicts both a wired network and a wireless network as representative examples only. Embodiments of the present invention are not limited to either wired, wireless, or hybrid wired/wireless network technology, but rather are applicable to any home network 20 technology operative to selectively distribute IPTV multimedia content from a home gateway 22 to one or more rendering units 30.

The STB 28 comprises a computing device communicatively connecting the rendering unit 30 to an IPTV application server (AS) in the service provider network 40. Generally, the STB 28 receives signals from the service provider network 40 and converts the signals into content that is provided to the rendering unit 30 for display to the subscriber. According to the present invention, the signals may carry content representative of both IPTV programs and an Electronic Program Guide (EPG) that displays lists of the IPTV programs clustered according to their semantic similarity.

The STB 28 also sends signals to the service provider network 40 indicating how interested a subscriber is in a given program. More particularly, the STB 28 includes a Semantic Analysis Client (SAC) application configured to calculate a preference score for the program. The score is sent to the service provider network 40, and the semantic cluster to which the given program belongs assumes that preference score. An IPTV-AS in the service provider network 40 ranks or orders the semantic program clusters based on their respective preference scores. The semantic cluster ranking is specific to each subscriber because the ranking process depends on the level of measured subscriber interest in a program being viewed.

According to one embodiment of the present invention, the STB 28 also includes circuitry and components for detecting and reporting the subscriber's interest in a given program. These components, which may include speech recognition and/or image capturing/processing circuitry, for example, detect the subscriber's interest in a given program while the subscriber views the program. Upon completion of the program, or when the subscriber changes the channel to another program, the STB 28 calculates a preference score based on the detected information and sends it to the IPTV-AS 42.

The preference score is a value indicating the possibility that the subscriber would be interested in viewing similar content in the future. The preference score is a program-specific score and, as described later in more detail, may be used to rank the semantic program clusters in order of subscriber preference, and prioritize future programs in a subscriber-specific Preferences Menu or channel lineup.

The service provider network 40 comprises an IPTV-AS 42 connected to a memory 44 and a Content Ontology Database (CODB) 46. Although only a single IPTV-AS 42 and CODB 46 is shown, those skilled in the art will appreciate that this is for illustrative purposes only. The service provider network 40 may comprise a plurality of IPTV-ASs 42 and/or CODBs 46 that provide IPTV content to the home network 20, as well as one or more ASs that provide other content such as games. Although depicted as a separate network 40, those of skill in the art will understand that in various embodiments, the service provider network 40 may be integrated with the IPTV network 12.

The IPTV-AS 42 comprises a Semantic Analysis Core Service (SACS) function responsible for providing the IPTV content, as well as an Electronic Program Guide (EPG) stored in memory 44, to the STB 28 in home network 20. More particularly, the SACS functions to cluster or group programs that are available to a subscriber within a predetermined temporal duration or window (e.g., the next one or two hours) into semantic program clusters based on each program's semantic similarity to a given program cluster. To accomplish this, the SACS may retrieve semantic models from the CODB 46, and/or other data sources 50 having one or more servers 52 connected to corresponding memory 54.

The CODB 46 contains a formal description or specification of the concepts and relationships that can exist between two or more objects. More specifically, the CODB 46 contains the semantic definitions needed by the SACS to classify the program content into an appropriate semantic cluster. Some exemplary information that may be in the CODB 46 includes, but is not limited to, the semantic concepts, the relationships (i.e. the binary associations) between those concepts, the attributes (quantitative/qualitative features) of the semantic concepts, and the data types used to specify the semantics of the EPG descriptions.

As is known in the art, the EPG contains descriptions for each program. Typically, a subscriber simply views the EPG in a viewing window displayed on the rendering unit 30. However, in accordance with the present invention, the content of the EPG is used to semantically classify the programs. Particularly, the SACS executing on the IPTV-AS 42 processes each of these descriptions and calculates a measure of how semantically similar the description of the given program is to those of one or more existing semantic clusters. If the semantic similarity exceeds a predetermined threshold, the SACS assigns the preference score associated with the semantic program cluster to the given program in the subscriber program preferences information.

Figure 2:
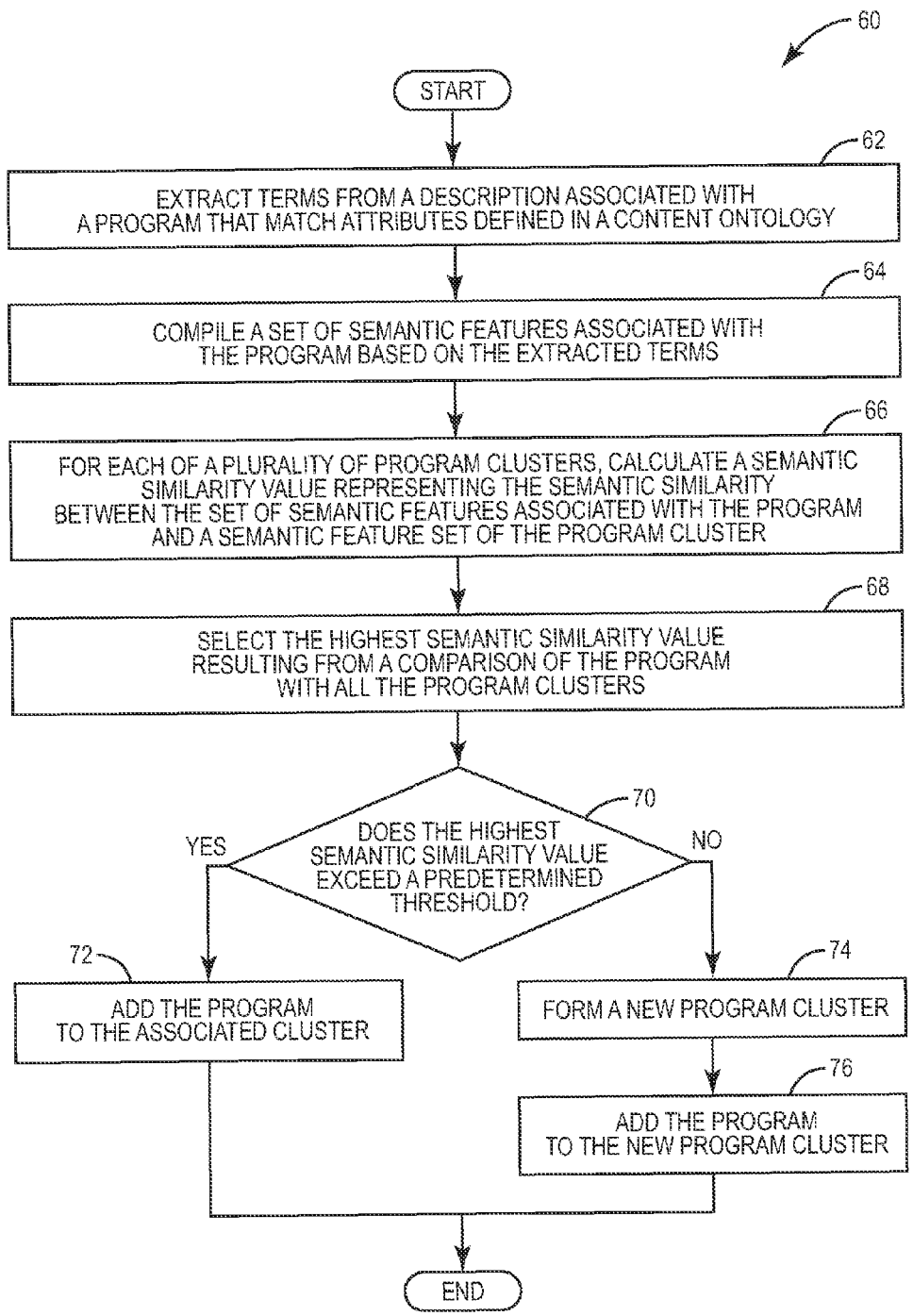
FIG. 2 is a flow diagram illustrating a method of clustering programs having similar content according to one embodiment of the present invention.

FIG. 2 is a flow chart illustrating an overview of a method 60 for clustering one or more programs based on the semantic similarity of their content. Considering that both the source of the semantic information (i.e. the EPG program descriptions) and the knowledge source(s) used to generate the similarity value are common to all subscribers, the processing required for clustering the programs are also common to all subscribers. Further, because the tasks are processor intensive, the logic for creating the clusters (i.e., the SACS) is executed at the IPTV-AS 42. Additionally, the granularity to which the programs may be compared for clustering depends on the complexity of the CODB 46 and on the level of detail in the EPG program descriptions. In some situations, the program descriptions provided with the EPG are inadequate with which to achieve a desired degree of semantic similarity. Therefore, as seen later in more detail, the SACS may retrieve supplemental information from the other data sources 50 and use this supplemental information to more accurately assign a given program to an appropriate semantic program cluster.

As seen in FIG. 2, the IPTV-AS 42 first compares the program description associated with a program to the information stored in the CODB 46, and extracts the artifacts (e.g., terms, words, phrases, signs, symbols, etc.) from the program description that match one or more of the attributes defined in the CODB 46 (box 62). The IPTV-AS 42 then processes those terms based on the information in the CODB 46 to compile a set of semantic features associated with the program (box 64). As previously stated, the CODB 46 stores information describing and/or defining the concepts and relationships that exist between multiple objects, such as the artifacts extracted from the program description. Therefore, in one embodiment, the IPTV-AS 42 utilizes these descriptions and definitions to compile the set of semantic features. Then, for each program in a predetermined time window and each program cluster, the IPTV-AS 42 calculates a semantic similarity value using the set of semantic features associated with the program, and a set of semantic features associated with each existing program cluster (box 66). The set of semantic features for any given program cluster comprises an amalgamation of the semantic features of each program in the given program cluster.

The semantic similarity value is a scalar value that represents how similar the content of the program is to the content of one or more other programs in a given program cluster. Higher values could indicate a higher degree of similarity while lower values could indicate a lesser degree of similarity. Therefore, in one embodiment, the IPTV-AS 42 selects the highest calculated semantic similarity value for further processing (box 68).

By itself, the highest semantic similarity value computed by the IPTV-AS 42 may not sufficiently indicate the similarity of the program to the other programs in the existing program clusters. For example, consider a relatively new program that, after the calculations have been completed, has a de minimus similarity to the programs of one cluster, and no similarity to the programs in other clusters. In such cases, the calculated semantic similarity value may not be accurate enough to assign a program to an existing program cluster. Therefore, in one embodiment, the IPTV-AS 42 compares the highest semantic similarity value against a predetermined confidence threshold (box 70). If the selected value equals or exceeds the threshold, the program is considered similar enough to the other programs in that program cluster and is added to that cluster (box 72). Otherwise, the program is not sufficiently similar. In these cases, the IPTV-AS 42 may form a new program cluster (box 74) and add the program to the newly formed program cluster (box 76). Thereafter, the newly formed program cluster is available to the IPTV-AS 42 to add other programs that are similar in content to the program.

Those skilled in the art will appreciate that the semantic similarity value may be calculated using any known computation. However, in one embodiment, the SACS computes the semantic similarity value sim(a, b) representing the similarity between the program and the program cluster utilizing the following formula:

$$sim(a, b) = \frac{f(S(a) I\ S(b))}{f(S(a) I\ S(b)) + \alpha(f(S(a) - S(b)) + f(S(b) I\ S(a))} g e^{1 - \frac{N}{|S(a) I\ S(b)|}}$$

where:
S(a) and S(b) denote the sets of semantic features for the program, and the existing program cluster, respectively;
function $f$ quantifies the semantic weight of the semantic features S(a) and S(b) based on the information and data contained in the CODB 46. A higher resultant value could indicate a greater number of relevant artifacts (e.g., words, phrases, signs, symbols, etc.) in the program or program cluster. For example, consider a case where $f(S(a))=|S(a)|$, in which $|S(a)|$ represents the cardinality of S(a). In this case, all semantic features would be considered equally relevant;
the numerator $f(S(a)I\ S(b))$ is a semantic weight of the common semantic features between the program and the constituent programs in the existing program cluster;
the denominator $f(S(a)I\ S(b))+\alpha(f(S(a)-S(b))+f(S(b)I\ S(a))$ is a sum of the semantic weight of the semantic features common to both the program and the program cluster, and a measure of the semantic weight of dissimilar features (i.e., the semantic features that are in either the program or the program cluster, but not both);
α is a constant used as a scaling factor to adjust the closeness of a given semantic factor;
the '-' symbol denotes a set difference operator (i.e., returns the semantic features that are associated with the program, but not the program cluster;

N is a threshold for the number of relevant features of a program cluster (i.e., the number of semantic features included from the CODB 46) and the program description included with the semantic cluster; and The term $$e^{1-\frac{N}{|S(a) I S(b)|}}$$

represents the limit of the semantic similarity value. This term prevents the unbound growth of the program cluster since the semantic model for the cluster is updated only if the semantic similarity of S(a) and S(b) increases.

Figure 3:
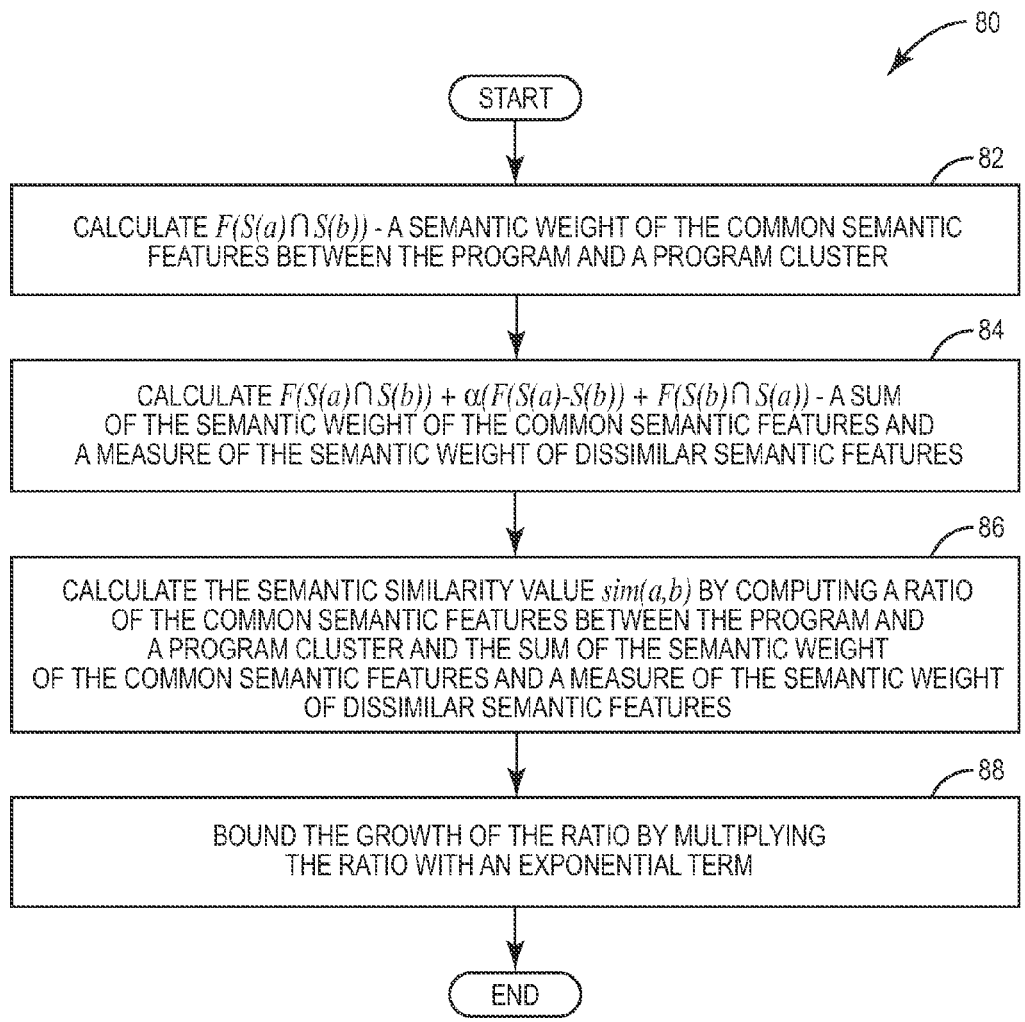
FIG. 3 is a flow chart illustrating a method of calculating the similarity between two concepts according to one embodiment of the present invention.

FIG. 3 is a flow diagram illustrating a method 80 of computing the semantic similarity value sim(a, b) between a program and a given program cluster using the above formula according to one embodiment of the present invention. Method 80 begins with the IPTV-AS 42 computing $$\zeta(S(a) I S(b))$$

to obtain the semantic weight of the common semantic features between the program and the given program cluster (box 82). The IPTV-AS 42 then computes $$f(S(a) I S(b))+\alpha(f(S(a)-S(b))+f(S(b) I S(a))$$

to obtain the sum of the semantic weight of the common features, and a measure of the semantic weight of the dissimilar semantic features (box 84). The IPTV-AS 42 then computes the semantic similarity value sim(a,b) by calculating the ratio $$\frac{f(S(a) I S(b))}{f(S(a) I S(b)) + \alpha(f(S(a) - S(b)) + f(S(b) I S(a))}$$

(box 86), and bounds the growth of the semantic similarity value sim(a,b) by multiplying $$e^{1-\frac{N}{|S(a) I S(b)|}}$$

the resultant ratio by the exponential term (box 88).

In some cases, the descriptions of the programs may not be as detailed as possible, and/or may not be as accurate as possible. This could negatively affect the ability of the present invention to accurately place a given program into an appropriate program cluster. Therefore, in one embodiment, the present invention is configured to utilize knowledge sources other than the CODB 46 such as data source 50 to determine the artifacts for the sets of semantic features for the program.

Figure 4:
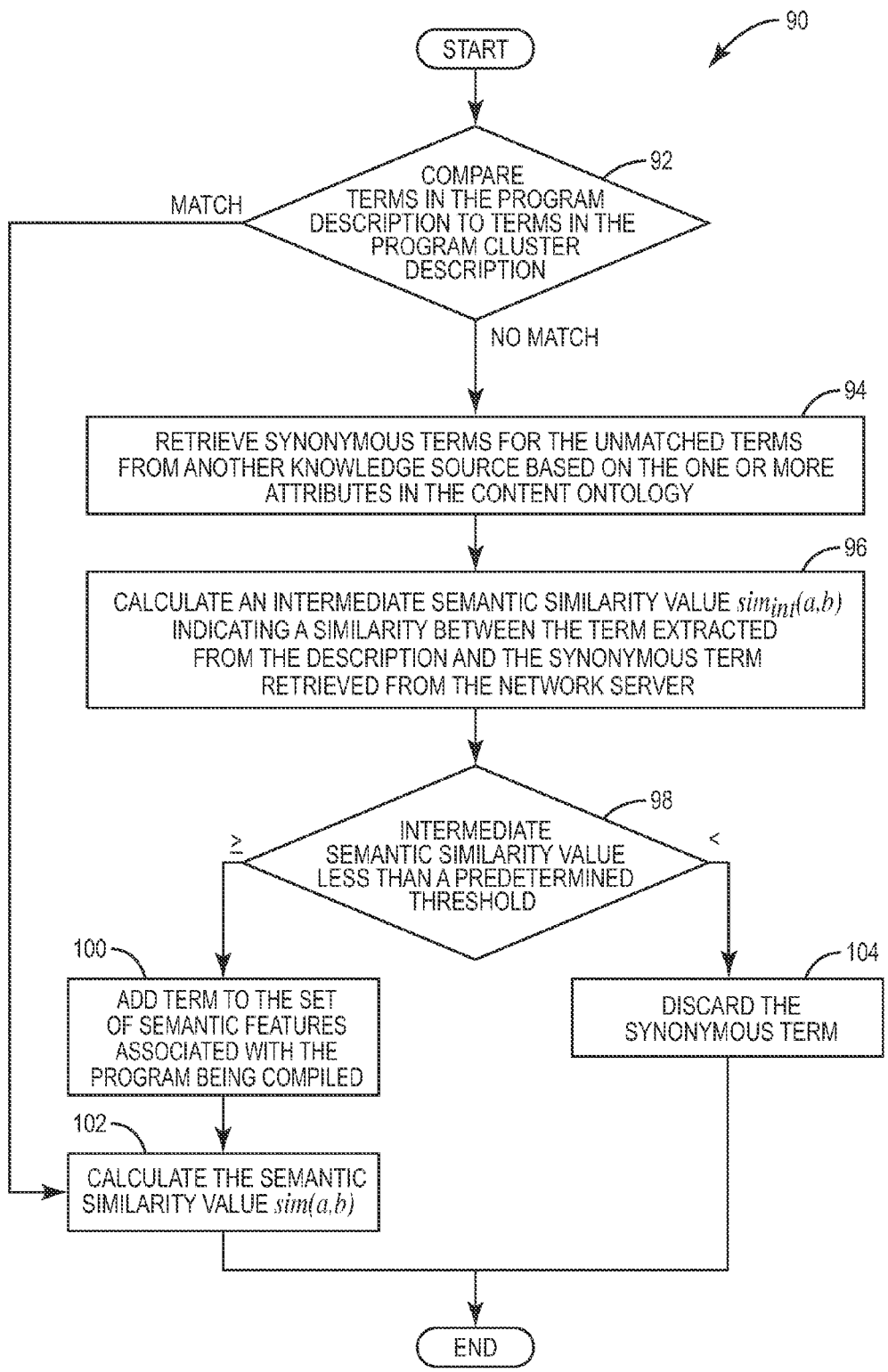
FIG. 4 is a flow chart illustrating a method of clustering programs having similar content according to one embodiment of the present invention.

FIG. 4 is a flow chart illustrating a method 90 by which the IPTV-AS 42 determines such supplemental information. Method 90 begins by the IPTV-AS 42 comparing the artifacts (e.g., the terms) in the description of the program to the artifacts in the description associated with a given program cluster (box 92). If there is a match, the IPTV-AS 42 will calculate the semantic similarity value sim(a,b) as previously described (box 102). If there is no match, however, the IPTV-AS 42 searches other sources, such as data source 50, for example, using the attributes contained in the CODB 46 to determine other terms that are synonymous to the unmatched terms in the program description (box 94). Provided synonymous terms are found, the IPTV-AS 42 calculates an intermediate semantic similarity value $sim_{int}(a, b)$ to determine the similarity between the terms extracted from the description and the synonymous terms retrieved from the data source 50 (box 96). If the intermediate value equals or exceeds a predetermined threshold (box 98), the synonymous terms are added to the set of semantic features for the program (box 100). These terms will then be utilized to calculate the semantic similarity value sim(a,b) as previously described (box 102). If the intermediate value does not equal or exceed the predetermined threshold, however, the terms retrieved from the server 50 are discarded (104).

As stated previously, the present invention is also configured to update the programs in the program clusters based on subscriber-supplied data. Thus, programs may be maintained in a given program cluster, or removed from the given program cluster, based on the level of subscriber interest in the program. When a program is removed from a cluster, only those semantic features that are specific to the removed program are deleted. Any semantic features that are common to the other programs in the cluster are not deleted. This level of subscriber interest in a given program is indicated using a preference score that may be calculated at the STB 28, or at the IPTV-AS 42. As described in more detail later, the preference score may be calculated based on direct or indirect subscriber input regarding the content of the given program.

Figure 5A:
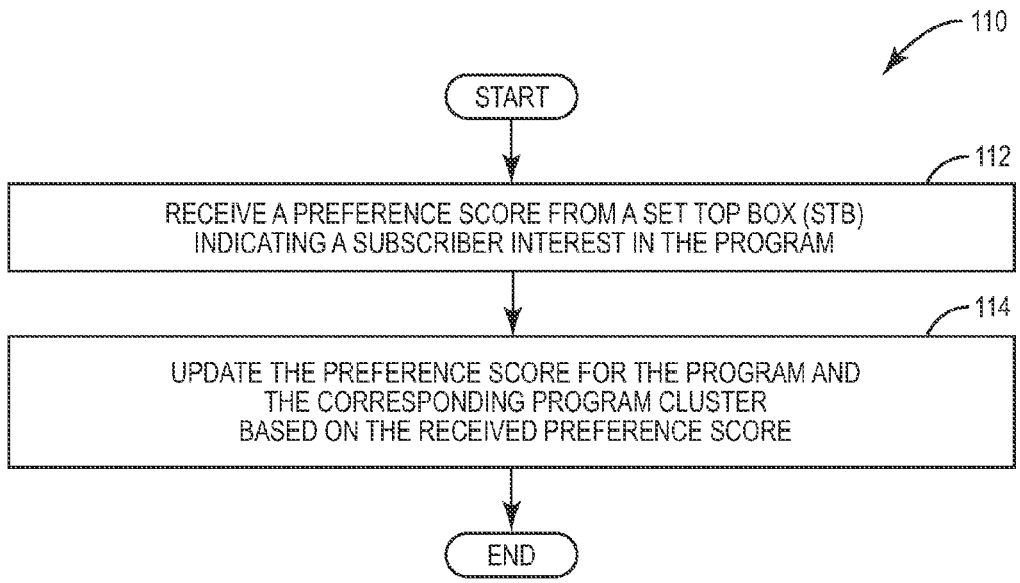
FIGS. 5A-5B are flow charts illustrating a method of receiving one or more parameters that are utilized to estimate subscriber interest and/or preference for particular content according to one embodiment of the present invention.

FIG. 5A is a flow chart illustrating a method 110 by which the IPTV-AS 42 updates the preference score of a given program and the corresponding program cluster based on a preference score calculated at and provided by STB 28. As seen in FIG. 5A, the IPTV-AS 42 receives a preference score from the STB indicating the level of subscriber interest in the program (box 112). The IPTV-AS 42 then updates the preference score for the program, and the corresponding program cluster to which the program belongs, based on this preference score (box 114).

Figure 5B:
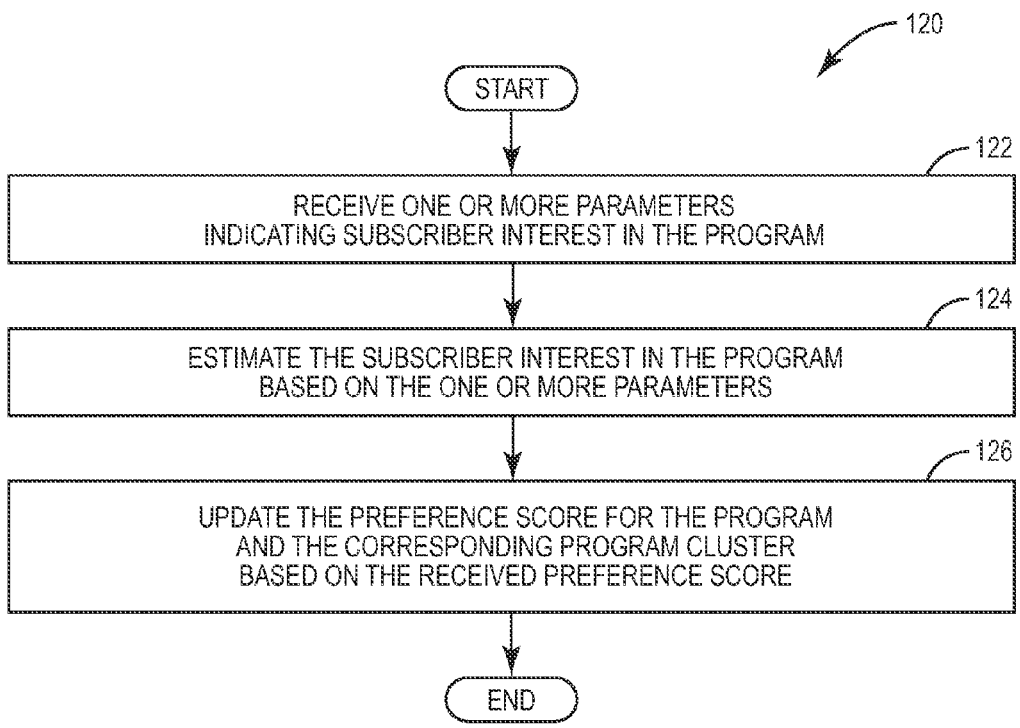

FIG. 5B illustrates a method 120 according to another embodiment in which the IPTV-AS 42 calculates the preference score. In method 120, the IPTV-AS 42 receives one or more parameters from the STB 28 that indicate the subscriber interest in the program (box 122). Such parameters, as described in more detail later, may comprise data that is based on indications that are audibly and/or visually detected by the STB 28 before, during, and/or after a given program is rendered to the subscriber. Once received, the IPTV-AS 42 estimates the subscriber interest in the program based on the parameters using any computational method known in the art (box 124). Once estimated, the IPTV-AS 42 updates the preference score for the program, and the corresponding program cluster, based on the computed preference score (box 126).

Figure 6:
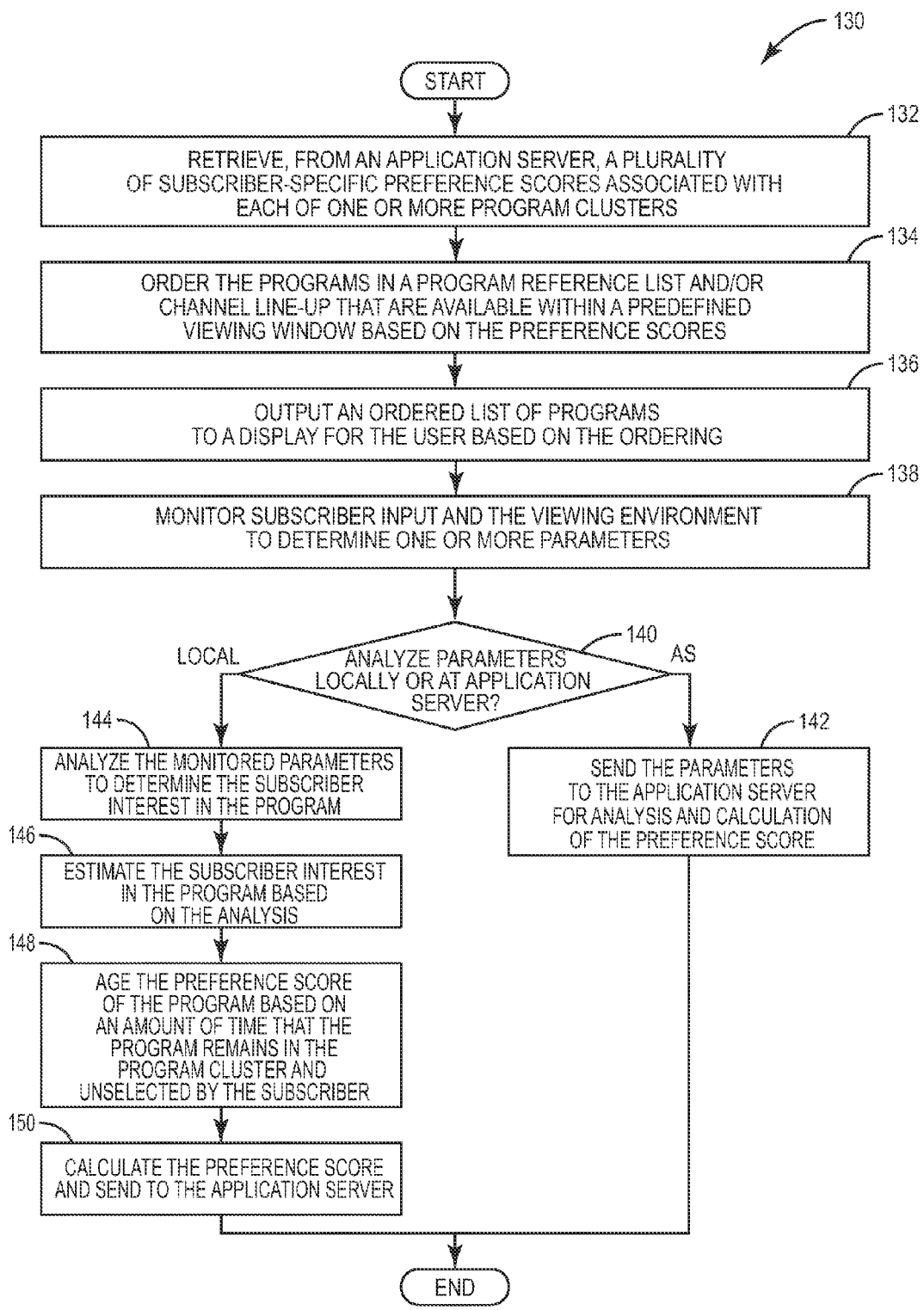
FIG. 6 is a flow chart illustrating a method performed at a STB of monitoring a given semantic program cluster, and providing the parameters for an analysis of subscriber interest in the programs.

FIG. 6 illustrates a method 130 in which the STB 28 collects data indicative of the subscriber interest in a given program, and calculates the preference score based on that data. Method 130 begins with the STB 28 retrieving, from the IPTV-AS 42, a plurality of subscriber-specific preference scores associated with each of the program clusters (box 132). The preference scores may be retrieved along with the program clusters, or independently of the program clusters. In this embodiment, the preference scores are retrieved independently of the program clusters. Thus, the STB 28 retrieves the programs within the predetermined viewing window, as well as the mapping of the programs to the retrieved preference scores. Based on the preference scores, the STB 28 orders or ranks the programs in the subscriber preference list and/or the channel line-up (box 134), and outputs the ordered programs that are available for rendering or viewing by the subscriber within a predetermined viewing window as a list, for example, to the rendering unit 30 (box 136). As is conventional, the subscriber may select a program of interest from the list for rendering on the rendering unit 30.

While the subscriber views the list of available programs and/or a selected program, the STB 28 is configured to monitor the subscriber's viewing environment for subscriber input to determine the level of subscriber interest in a given program (box 138). For example, as seen later in more detail, the STB 28 may capture images of a subscriber before, during, and/or after a program is rendered, and analyze the facial expressions of the subscriber and/or others to determine the level of subscriber interest. Alternatively, or in addition, the STB 28 may detect and analyze audible sound uttered by the subscriber in response to selecting a program or viewing a program. Other types of input associated with the subscriber that may be analyzed by the STB 28 include, but are not limited to, the number of people in an area viewing a given program, how long the program is being viewed, and the number of times a subscriber skipped over a given program while searching for a program to watch. In some embodiments, the STB 28 will match the program selected by the subscriber to criteria in a subscriber profile, or base the subscriber interest on data expressly input by the subscriber using, for example, a keypad or appropriately configured remote control unit.

Once the parameters are collected, the analysis of the parameters to determine subscriber interest may occur at the IPTV-AS 42, or at the STB 28 (box 140). Where the IPTV-AS 42 performs the analysis, the STB 28 sends the parameters to the IPTV-AS 42. Upon receipt, a software module at the IPTV-AS 42, such as the SACS, calculates the preference score as previously described (box 142). Where the STB 28 performs the analysis, a software module at the STB 28, such as the SAC, will analyze the parameters to estimate the subscriber interest (boxes 144, 146).

In addition to quantifying the subscriber interest in a given program, the STB 28 will also "age" the preference scores of the constituent programs in the program cluster based on an amount of time that the constituent programs remains in the program cluster without being selected by the subscriber (box 148). For example, a given program may have a relatively high preference score upon first being placed into a program cluster. However, as the subscriber will likely tire of the program, the frequency with which the subscriber selects the given program for viewing will also decline. Thus, as the subscriber views the available programs in a given program cluster without selecting the given program, the STB 28 may decrease the preference score for given program proportionally to the length of time the program has been in the cluster without being selected by the subscriber. Regardless of whether the preference score is increased or decreased, however, the present invention configures the STB 28 to calculate the preference score for the program and send it to the IPTV-AS 42 (box 150). Upon receipt, the IPTV-AS 42 may, based on configuration information, increase or decrease the preference score of the program cluster, or simply leave the preference score unchanged.

Figure 7:
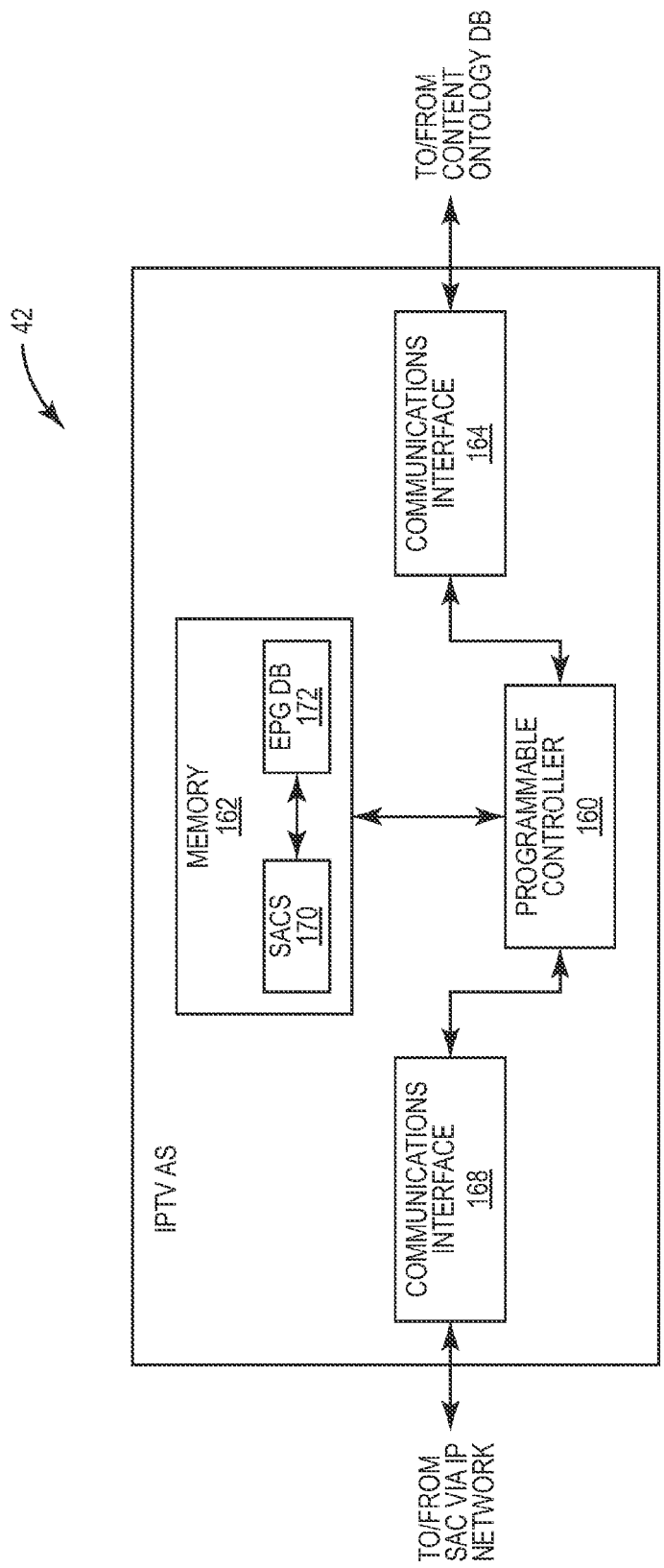
FIG. 7 is a block diagram illustrating some of the components of an application server configured to function according to one embodiment of the present invention.

FIG. 7 is a block diagram illustrating some of the components of an IPTV-AS 42 configured according to one embodiment of the present invention. As seen in FIG. 7, the IPTV-AS 42 is a computing device, such as a server, for example, and comprises a programmable controller 160, a memory 162, and a pair of communications interfaces 164, 168.

The controller 160 may, for example, be any of a variety of programmable microprocessors that control the operation of IPTV-AS 42 according to instructions and data stored in memory 162. Such program instructions include the instructions that define the Semantic Analysis Core Service (SACS) 170 and the Electronic Program Guide (EPG) DB 172.

The SACS 170 contains data and/or instructions that are executed by the controller 160. When executed, the SACS 170 causes the controller 160 to analyze the semantic similarity between the programs and the program clusters, and assign the programs that are available for rendering within a predetermined viewing window (e.g., within the next hour or two hours) into their appropriate semantic clusters, as previously described. Particularly, the SACS 170 communicates with the CODB 46 via the communications interface 164 to retrieve one or more semantic models. The SACS 170 then determines the set of semantic features associated with the programs and the program clusters based on the retrieved semantic models. In addition, the SACS 170 may also contain the instructions and/or data needed to retrieve supplemental information from the network server 50, as previously described. The SACS 170 also contains the instructions required to analyze the semantic features, calculate the semantic similarity value, and the preference score, as well as assign programs to specific program clusters based on the analysis, as previously described.

The communications interfaces 164, 168 may be the same interface or different interfaces. Functionally, however, one of the interfaces 164 communicatively connects the IPTV-AS 42 to the CODB 46, while the other interface 168 communicatively connects the IPTV-AS 42 to the STB 28. Via interface 168, the SACS 170 communicates the program clusters, the parameters on which the subscriber interest is based, and the preference scores, along with other data and information, with a corresponding Semantic Analysis Client (SAC) software module executing on the STB 28.

Figure 8:
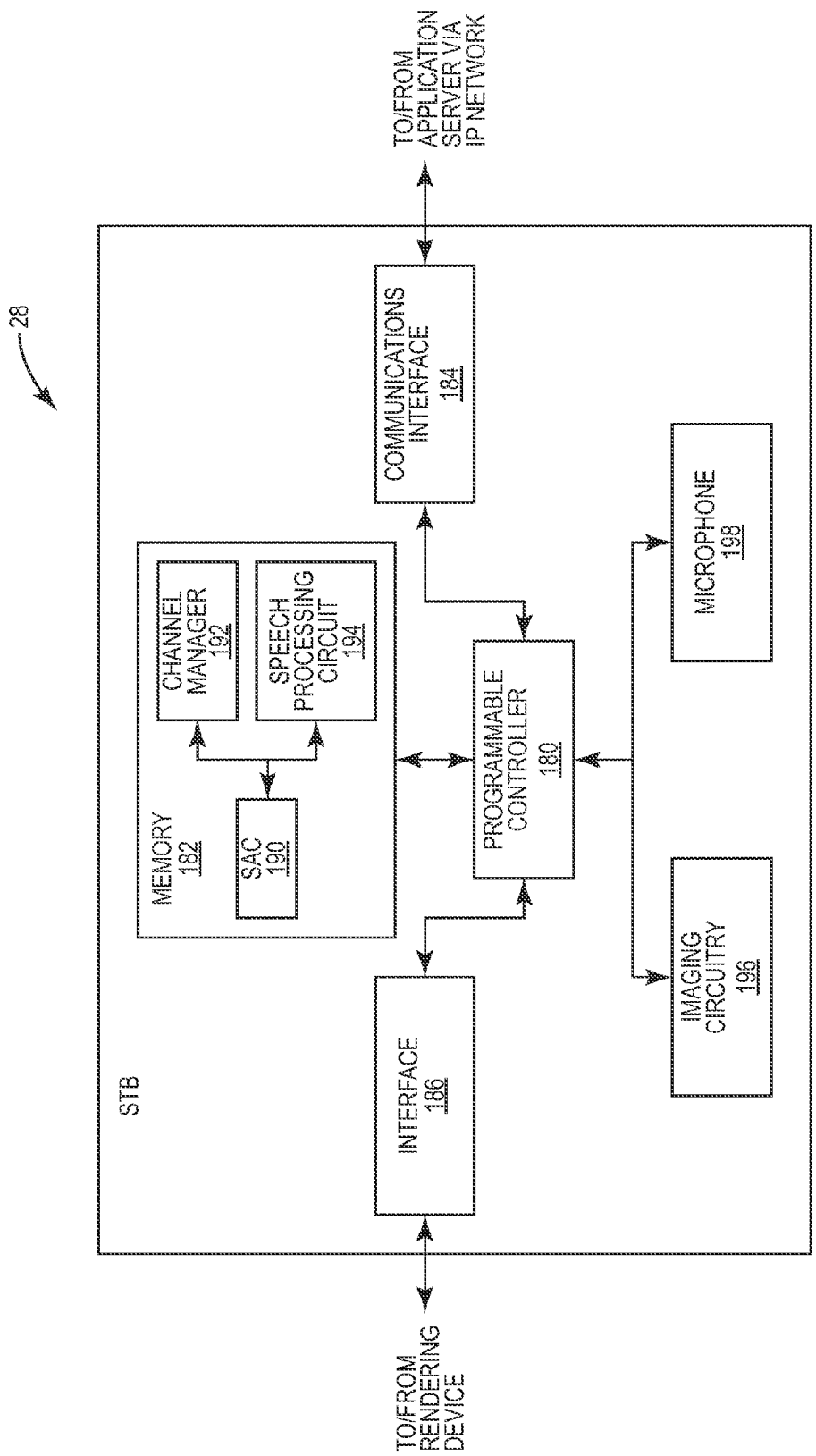
FIG. 8 is a block diagram illustrating some of the components of an STB configured to function according to one embodiment of the present invention.

FIG. 8 is a block diagram illustrating some of the component parts of an STB 28 configured to function according to one embodiment of the present invention. As seen in FIG. 8, the components include a programmable controller 180, memory 182, and a pair of communications interfaces 184, 186. The controller 180 may comprise any of a variety of programmable microprocessors that control the operation of the STB 28 according to instructions and data stored in memory 182. Such program instructions include, as stated above, the Semantic Analysis Client (SAC) 190, a channel manager (CM) 192, and speech and/or image processing software 194. As is known in the art, the controller 180 may generate the needed signals for sending media content, such as IPTV-associated video and/or audio, to the rendering unit 30 via interface 186.

The SAC 190 also communicates with the SACS 170 via interface 184 to receive the program clusters and the EPGs, and to send the SACS 170 the preference scores for the clusters. Where the SAC 190 sends the preference scores, the SAC 190 contains the code and instructions for computing the preference scores based on one or more parameters indicating the subscriber interest in a given program. In embodiments where the SACS 170 at the IPTV-AS 42 computes the preference scores, the SAC 190 contains the instructions to cause the controller 180 to send the collected subscriber interest indicators to the SACS 170. As previously stated, the SAC 190 also contains the code and instructions for ordering or ranking the programs in the subscriber preference list and/or the channel line-up based on the computed preference scores.

The CM 192 comprises code to manage the channel and/or program positions in the program preference list and/or the channel line-up based on the computed program preference scores. Particularly, the positions of the programs in a subscriber's "Favorites" list are updated by the CM 192 each time the subscriber changes channels or switches to a new program.

The speech-processing software 194 contains the code necessary for the controller 180 to recognize certain keywords or utterances made by a subscriber. Particularly, the STB 28 includes a microphone 198 that detects audible sound. The detected sounds are passed to the speech-processing software 194 and processed to determine whether the sounds can be recognized as predetermined keywords. For example, a subscriber, or others that are viewing the same program as the subscriber, may utter "That was a good show," or "That show was terrible" after a program is finished. The microphone 198 would detect this phrase and, after converting the utterance to digital signals, pass the utterance to the speech-processing software 194. The speech processing software 194, which executes on the controller 180 would then detect the presence of one or more keywords in the utterance and pass that information to a Business Logic (BL) portion of the SAC 190.

The STB 28 may also include imaging circuitry 196 for capturing an image of the face of a subscriber who is currently viewing, or has completed viewing, a program. In one embodiment, the imaging circuitry 196 also processes the captured image using well-known techniques to perform a facial analysis. The results of the analysis can then be utilized to update a preference score for the program. For example, if the results indicate that a subscriber is smiling, the SAC 190 could determine that the subscriber liked the program. Conversely, if the analysis reveals that the subscriber is frowning, or that the subscriber's facial expression is indifferent, the SAC 190 could reduce or decrease the preference score for the program.

Additionally, the SAC 190 may, in some embodiments, determine or update a preference score based on both audio and visual reactions of the subscriber and/or other people that may be viewing a selected program. Further, the reactions may be expected or unexpected, and/or ambiguous such that the SAC 190 can use well-known processing techniques to interpret the reactions and calculate a preference score. For example, consider a subscriber watching a given program. During the program, the subscriber may laugh. The SAC 190 could audibly and visually detect the subscriber laughing, as previously described, and determine whether the reaction will increase or decrease a score. For example, if the subscriber is currently viewing a comedy, laughter might be expected. Thus, the laughter could be determined as a positive reaction and increase the preference score. In contrast, if the program were a political commentary or a serious drama, laughter would not be expected. In these cases, the laughter could indicate a negative reaction and decrease the preference score. In another example, the STB 28 may detect the subscriber's facial expression or audible exclamations (or both) of curiosity or astonishment. Depending on the type of content currently being viewed by the subscriber, the STB 28 could calculate the preference score appropriately.

Further, the STB 28 may use other indicators to appropriately calculate a preference score. For example, the STB 28 may monitor the number of people in the subscriber's household that are viewing a given program, the length of time that the program is being rendered, or the number of times a subscriber skipped over the program before choosing the current program. The STB 28 may also monitor when the subscriber watches a program and compare the time with one or more predetermined temporal ranges defined by the subscriber.

The present invention will help to facilitate subscriber loyalty to a given provider because the subscribers are informed about programs that they may find interesting. Further, the subscriber may be informed about the programs even if the programs are on channels that the subscriber does not normally watch. As for the content providers, the present invention allows them to easily identify the types of programs that subscribers like to watch. Armed with such information, the present invention can help the content providers to target advertising more appropriately.

Additionally, the present invention effectively partitions the tasks to be performed between a network-based application server and a subscriber-side STB. More particularly, the application server can shoulder much of the load and perform the semantic clustering, while the STB will determine the preference scores for the programs. Further, the algorithm for calculating the semantic similarity between a program and the program clusters allows for an easy integration knowledge sources, such as web-based ontologies, so long as those ontologies are consistent with any local ontologies. Moreover, the content provider controls the threshold that defines the granularity of the program clusters. Therefore, the content provider can tune the system for both performance (i.e., server load) and user experience (i.e., semantic relevance of terms).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of clustering programs having similar content, the method comprising:

extracting terms from a description associated with a program that match attributes defined in a content ontology;

compiling a set of semantic features associated with the program based on the extracted terms;

for each of a plurality of program clusters, each cluster comprising a plurality of programs having similar content, calculating a semantic similarity value representing the semantic similarity between the set of semantic features associated with the program and a semantic feature set of the program cluster, the semantic similarity value being calculated as $$sim(a, b) = \frac{F(S(a) I S(b))}{F(S(a) I S(b)) + \alpha(F(S(a) - S(b)) + F(S(b) I S(a))} ge^{1 - \frac{N}{|S(a) I S(b)|}}$$

wherein:

sim(a,b) denotes the semantic similarity value;

F is a function that quantifies a semantic weight of the semantic features as specified by the content ontology;

S(a) denotes the semantic features associated with the program;

S(b) denotes the semantic features associated with the program cluster;

a is a constant;

e is Euler's constant; and

N is a threshold indicating a number of relevant semantic features for the program cluster;

selecting the highest semantic similarity value resulting from a comparison of the program with all the program clusters in the plurality of program clusters; and if the highest semantic similarity value exceeds a predetermined threshold, adding the program to the associated cluster.

2. The method of claim 1 further comprising forming a new program cluster and adding the program to the new program cluster if the highest semantic similarity value does not exceed the predetermined threshold.

3. The method of claim 1 further comprising, for each term in the program description that does not match one or more attributes in the content ontology, retrieving a synonymous term from a network server based on the one or more attributes.

4. The method of claim 3 further comprising:
calculating an intermediate semantic similarity value indicating a similarity between the terms extracted from the description and the synonymous terms retrieved from the network server; and
discarding a synonymous term if the corresponding intermediate semantic similarity value is less than the predefined threshold.

5. The method of claim 1 further comprising:
receiving a preference score indicating subscriber interest in the program; and
updating a preference score for the program and the corresponding program cluster based on the received preference score.

6. The method of claim 1 further comprising:
receiving one or more parameters indicating subscriber interest in the program; and
estimating the subscriber interest in the program based on the one or more parameters.

7. The method of claim 6 wherein the one or more parameters comprise audible sounds uttered by the subscriber.

8. The method of claim 6 wherein the one or more parameters comprise visual features expressed by the subscriber.

9. The method of claim 6 wherein the one or more parameters comprise an expected reaction expressed by the subscriber while the program is being rendered, and wherein the expected reaction is based on the program content.

10. The method of claim 6 wherein the one or more parameters comprise one or more viewing parameters associated with the program.

11. The method of claim 10 wherein the viewing parameters comprise an elapsed time that the program is rendered to the subscriber.

12. The method of claim 10 wherein the viewing parameters comprise a date and/or time at which the program is rendered to the subscriber relative to one or more subscriber-defined temporal ranges.

13. The method of claim 10 wherein the viewing parameters comprise a number of devices associated with the subscriber that renders the program.

14. The method of claim 10 wherein the viewing parameters comprise a number of times the program was considered, but not selected, for rendering by the subscriber.

15. The method of claim 14 wherein the semantic feature set of the program cluster comprises an amalgamation of the set of semantic features associated with each of the constituent programs in the program cluster.

16. An application server configured to cluster programs having similar content, the server comprising:
memory configured to store a program description associated with a program;
a semantic analysis module communicatively connected to the memory and a content ontology database; and
a programmable controller configured to:
extract terms from the program description that match attributes defined in the content ontology;
compile a set of semantic features associated with the program based on the extracted terms;
for each of a plurality of program clusters, each cluster comprising a plurality of programs having similar content, calculate a semantic similarity value representing the semantic similarity between the set of semantic features associated with the program and a semantic feature set of the program cluster, the semantic similarity value being calculated as $$sim(a, b) = \frac{F(S(a) \cap S(b))}{F(S(a) \cap S(b)) + \alpha(F(S(a) - S(b)) + F(S(b) \cap S(a)))} \cdot e^{1 - \frac{N}{|S(a) \cap S(b)|}}$$

wherein:
sim(a,b) denotes the semantic similarity value;
F is a function that quantifies a semantic weight of the semantic features as specified by the content ontology;
S(a) denotes the semantic features associated with the program;
S(b) denotes the semantic features associated with the program cluster;
a is a constant;
e is Euler's constant; and
N is a threshold indicating a number of relevant semantic features for the program cluster;
select the highest semantic similarity value resulting from a comparison of the program with all the program clusters in the plurality of program clusters; and
if the highest semantic similarity value exceeds a predetermined threshold, add the program to the associated cluster.

17. The application server of claim 16 wherein the controller is further configured to form a new program cluster and add the program to the new program cluster if the highest semantic similarity value does not exceed the predetermined threshold.

18. The application server of claim 16 wherein, for each term in the program description that does not match one or more attributes in the content ontology, the controller is further configured to retrieve a synonymous term from a network server based on the one or more attributes.

19. The application server of claim 18 wherein the controller is further configured to:
calculate an intermediate semantic similarity value indicating a similarity between the terms extracted from the program description and the synonymous terms retrieved from the network server; and
discard a synonymous term if the corresponding intermediate semantic similarity value is less than a predefined threshold value.

20. The application server of claim 16 wherein the controller is further configured to:
receive a preference score indicating subscriber interest in the program; and
update a preference score for the program and the corresponding program cluster based on the received preference score.

21. The application server of claim 16 wherein the controller is further configured to:
receive one or more parameters indicating subscriber interest in the program; and
estimate the subscriber interest in the program based on the one or more parameters.

22. The application server of claim 21 wherein the one or more parameters comprise audible sounds uttered by the subscriber.

23. The application server of claim 21 wherein the one or more parameters comprise visual features expressed by the subscriber.

24. The application server of claim 21 wherein the one or more parameters comprise an expected reaction expressed by the subscriber while the program is being rendered, and wherein the expected reaction is based on the program content.

25. The application server of claim 21 wherein the one or more parameters comprise one or more viewing parameters associated with the program.

26. The application server of claim 25 wherein the viewing parameters comprise an elapsed time that the program is rendered to the subscriber.

27. The application server of claim 25 wherein the viewing parameters comprise a date and/or time at which the program is rendered to the subscriber relative to one or more subscriber-defined temporal ranges.

28. The application server of claim 25 wherein the viewing parameters comprise a number of devices associated with the subscriber that render the program.

29. The application server of claim 25 wherein the viewing parameters comprise a number of times the program was considered, but not selected, for rendering by the subscriber.

* * * * *